United States Patent
Depestel

(10) Patent No.: US 7,874,133 B2
(45) Date of Patent: Jan. 25, 2011

(54) FORAGE HARVESTER HAVING A BLOWER

(75) Inventor: Bernard E. D. Depestel, Oedelem (BE)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/658,652

(22) Filed: Feb. 12, 2010

(65) Prior Publication Data

US 2010/0205923 A1    Aug. 19, 2010

(30) Foreign Application Priority Data

Feb. 13, 2009    (BE) ................ 2009/0082

(51) Int. Cl.
    *A01D 87/10* (2006.01)
(52) U.S. Cl. ........................ 56/13.3; 56/16.5
(58) Field of Classification Search .............. 56/16.4 B, 56/16.5, 501, 153, 208, 212, 213, 16.4 R, 56/13.3; 241/101.742, 101.72, 101.77, 101, 241/762

See application file for complete search history.

(56) References Cited

U.S. PATENT DOCUMENTS

| | | | |
|---|---|---|---|
| 4,767,067 A * | 8/1988 | Bruer et al. ................ 241/81 |
| 5,082,189 A * | 1/1992 | Ernst et al. ................ 241/158 |
| 5,498,207 A * | 3/1996 | Cappon et al. ............. 460/119 |
| 5,863,005 A * | 1/1999 | Bramstedt et al. ..... 241/101.742 |
| 6,425,232 B1 * | 7/2002 | Desnijder et al. ......... 56/16.4 B |
| 6,539,693 B2 * | 4/2003 | Krone et al. ................. 56/16.6 |
| 6,604,352 B1 * | 8/2003 | Tyvaert et al. ........... 56/16.4 B |
| 6,817,167 B2 * | 11/2004 | Dykstra et al. ................ 56/153 |
| 6,988,352 B2 * | 1/2006 | Van Vooren ............. 56/16.4 R |
| 7,137,237 B2 * | 11/2006 | Van Vooren et al. ......... 56/12.8 |
| 7,654,068 B2 * | 2/2010 | Baaken .................... 56/16.4 B |
| 2008/0234020 A1 * | 9/2008 | Isfort ........................ 460/112 |

FOREIGN PATENT DOCUMENTS

| | | |
|---|---|---|
| DE | 3415488 | 10/1985 |
| DE | 19532669 | 3/1997 |
| WO | WO 2005009109 | 3/2005 |

* cited by examiner

*Primary Examiner*—Árpád Fábián-Kovács
(74) *Attorney, Agent, or Firm*—Michael G. Harms; Patrick M. Sheldrake

(57) ABSTRACT

A forage harvester having a header for harvesting crop from a field, a chopper for comminuting the crop harvested by the header, a spout from which the chopped crop is discharged and a rotary blower (10) for propelling the chopped crop from the chopper along an intake chute (18) leading to the spout. A deflector plate (14*a*) is provided at the entrance of the blower. The deflector plate (14*a*) is pivotable between a first position in which the crop is guided to flow in a substantially tangential direction relative to the trajectory of the blades (10*a*) of the blower (10) and a second position in which the crop is deflected radially inwards from the tangential direction to impact the blades (10*a*) of the blower (10) at a point along their length.

8 Claims, 3 Drawing Sheets

Figure 1A:
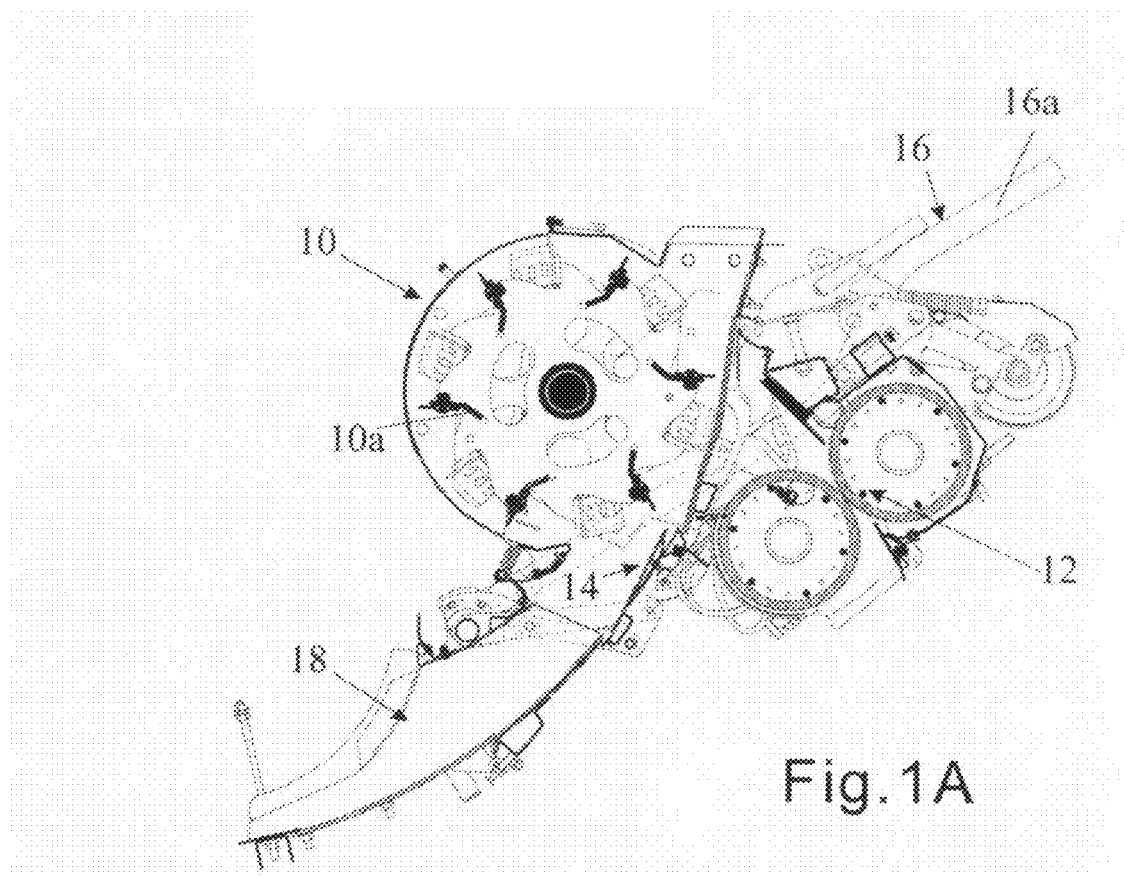

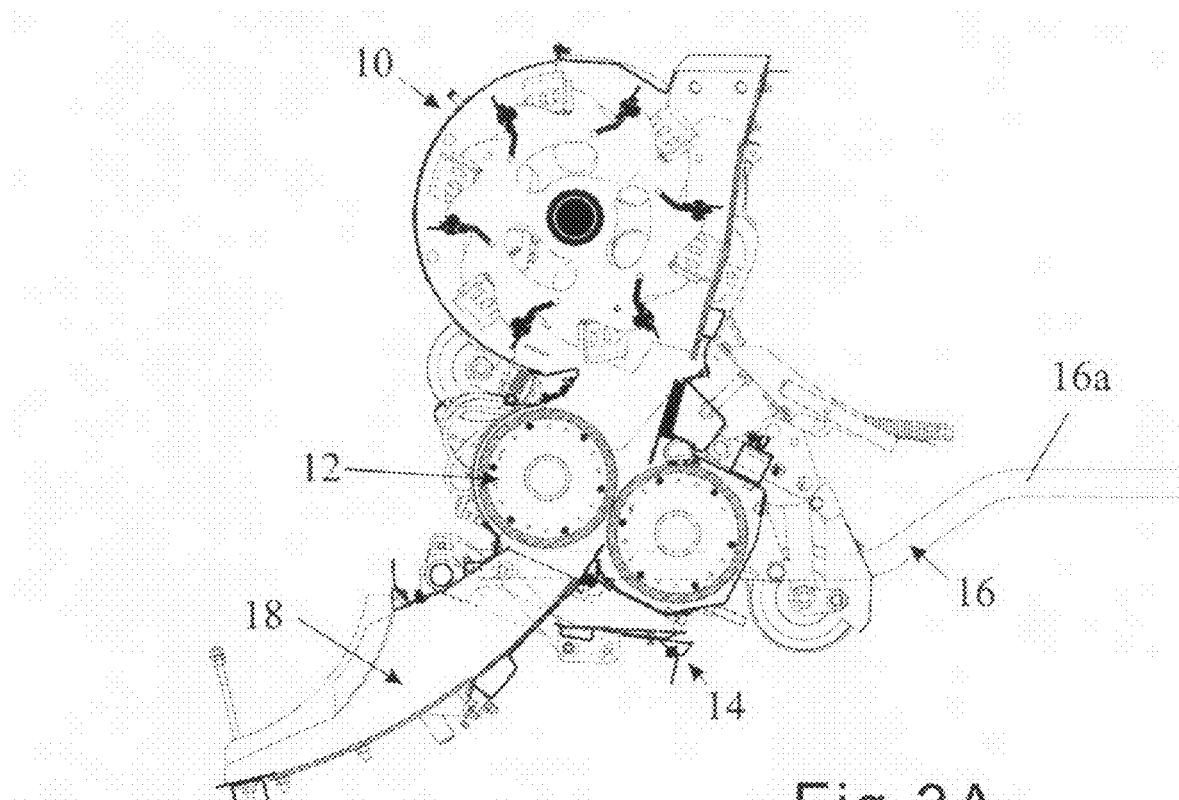
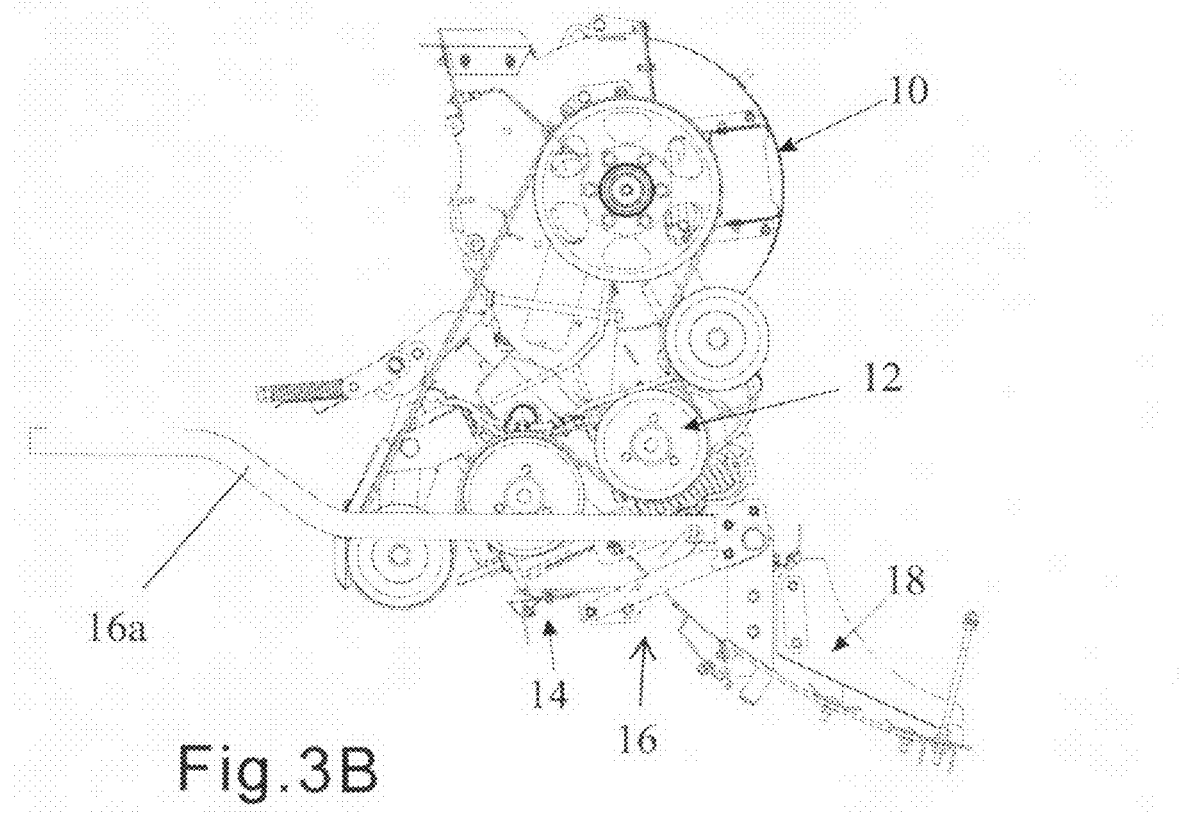

FORAGE HARVESTER HAVING A BLOWER

CROSS REFERENCE TO RELATED APPLICATIONS

This Patent Application claims priority under 35 U.S.C. §119 to BE 2009/0082, filed on Feb. 13, 2009 titled, "A Forage Harvester Having A Blower" and having Bernard E.D. Depestel as inventor. The full disclosure of BE 2009/0082 is hereby fully incorporated herein by reference.

This invention relates to a forage harvester and in particular to a blower assembly for receiving comminuted crop material and ejecting it through a spout.

Forage harvesters are machines which chop crop gathered from a field into small pieces to produce animal feed. In the case of crops such as grass or alfalfa, these will have been pre-cut and left to dry in the sun, so that the crop only needs to be gathered by the harvester. With other crops, such as maize, the forage harvester may also be required to cut the crop. Thus, the harvesters may be fitted with different headers to suit the crop being harvest ed.

The crop, whether cut maize or gathered grass, is fed into a rotating knife drum or cutter which comminutes the product. With grass crops, this alone is sufficient to produce the desired forage. However, when harvesting maize for silage purposes, the cutting alone does not suffice due to the presence of kernels in the crop. The kernels need to be cracked in order to release the nutrient, as uncracked kernels are hard for animals to digest. As cutting by the knife drum alone is insufficient to crack all the kernels, the crop is additionally passed through a crop processor which comprises two closely adjacent rollers, typically having serrated surfaces, which rotate such that there is slippage between the adjacent surfaces. The gap between the rollers is set to suit the size of grain passing through and the speed, rotational energy of the rollers, relative movement and serration of the surfaces together ensure cracking of any kernels that are still intact after chopping by the cutter.

The momentum of the maize from the crop processor or the grass from the cutter, as the case may be, carries the crop into an accelerator or blower which then propels it up a tower to a discharge spout through which it is discharged into a wagon or a trailer drawn by a separate vehicle driven alongside the harvester.

When chopping kernel-free crops, such as grass or alfalfa, the crop processor is not required and leaving it in place in the crop flow path results in its rollers being unnecessarily subjected to wear. To avoid such wear, it is known to remove the crop processor altogether from the harvester or to mount it in such a way that may be selectively introduced into and withdrawn from the crop flow path.

Blowers are known in the prior art that have a guide plate at their inlet directing the flow of chopped crop (maize, grass, . . . ) at a fixed angle into the blower body. In some cases, as described for example in EP 1 380 204, the direction of crop flow at the inlet is tangential to the trajectory of the rotor blades of the blower. In other configurations, as described for example in DE 10 018 825 and WO 91/11901, the direction of the crop flow at the inlet is angled away from the tangential direction further towards the axis of rotation of the blower, impacting the rotor blades of the blower at a point along their length.

Crop flow tangential to the trajectory of the blower blades is advantageous from an energy saving standpoint. If the crop flow is aimed other than tangentially, some of the momentum of the flow is lost by part of the flow bouncing back from the blower wall or the blower blades.

Tangential flow is however the optimum configuration only when the crop flow is steady. Under lower load conditions, more especially when harvesting less dense crop such as dried grass, the material is not grasped as well by the blades. This is particular the case when the clearance between the wall of the blower housing and the blade trajectory is increased on account of wear.

Because this clearance is critical, it is recommended to check the blower clearance as soon as the blower performance diminishes, as determined by the distance over which the crop is ejected from the spout. To improve performance under such conditions, it has been proposed previously to provide adjustable plates to change the distance of the blower rotor to the housing wall.

The present invention seeks to provide a forage harvester in which the performance of the blower can be optimized to suit different crops and to compensate for wear within the blower.

In accordance with the present invention, there is provided a forage harvester having a header for harvesting crop from a field, a chopper for comminuting the crop harvested by the header, a spout from which the chopped crop is discharged and a rotary blower for propelling the chopped crop from the chopper along a discharge chute leading to the spout, characterized in that a deflector plate is provided at the entrance of the blower, the deflector plate being movable between a first position in which the crop is guided to flow in a substantially tangential direction relative to the trajectory of the blades of the blower and a second position in which the crop is deflected radially inwards from the tangential direction to impact the blades of the blower at a point along their length.

In a preferred embodiment the deflector plate is connected to the blower housing by a linkage that allows movement between the first and second positions. The linkage preferably comprises a four-bar linkage. The linkage may comprise a lever arm connected to a pivot axis, which enables adjustment of the deflector plate by a single operator.

The adjustable deflector plate in the present invention is only intended to be used when harvesting crops such as grass that do not require a crop processor to be introduced into the crop flow path, to crush kernels after the crop has left the chopper and before it reaches the blower. In a harvester having a crop processor that may be selectively introduced into and withdrawn from the crop flow path, the deflector plate preferably forms part of an assembly that is moved away from the entrance to the blower when the crop processor is introduced into the crop flow path.

Conventionally, crop processors could be removed completely from the forage harvesters when they were not required but their assembly and removal was a complex task requiring several operatives and heavy lifting equipment. Furthermore, the entire harvester had to be designed in a manner to provide a service bay to allow personnel access to the crop processor.

An improvement proposed in EP 1 600 050 leaves the crop processor permanently on the harvester but mounts both the crop processor and the blower movably on the chassis of the harvester. When a crop processor is needed, the blower is raised to leave a gap between itself and the chopper and the crop processor is moved into the gap thus created. Systems of pivots and operating levers have furthermore been designed to enable a single operator to pivot the blower upwards and to swing the crop processor into the space created between the blower and the chopper.

In a preferred embodiment of the invention, the deflector plate assembly is mechanically coupled to the blower such that when the blower is raised to create a space for a crop processor, the assembly is moved away from the entrance to the blower to allow the output of the crop processor to flow into the blower without flowing past the deflector plate.

Figure 1B:
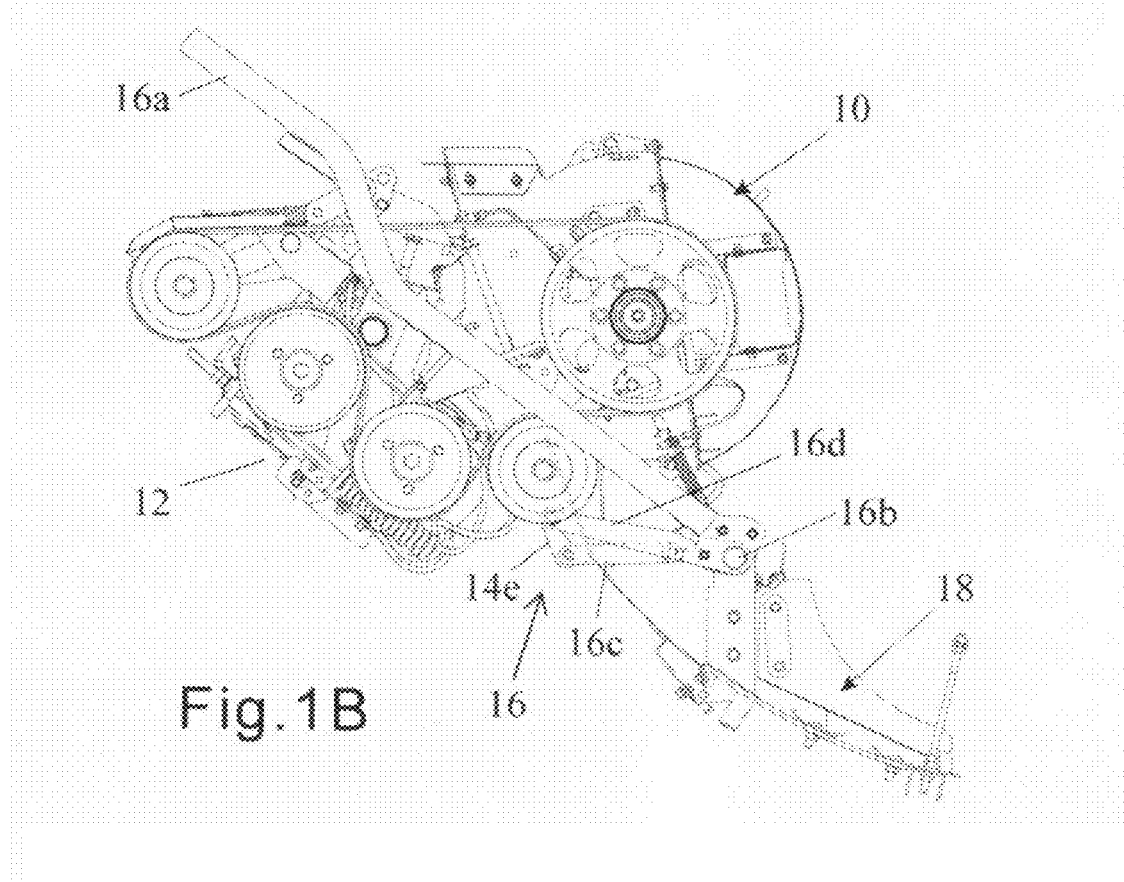
Figure 2A:
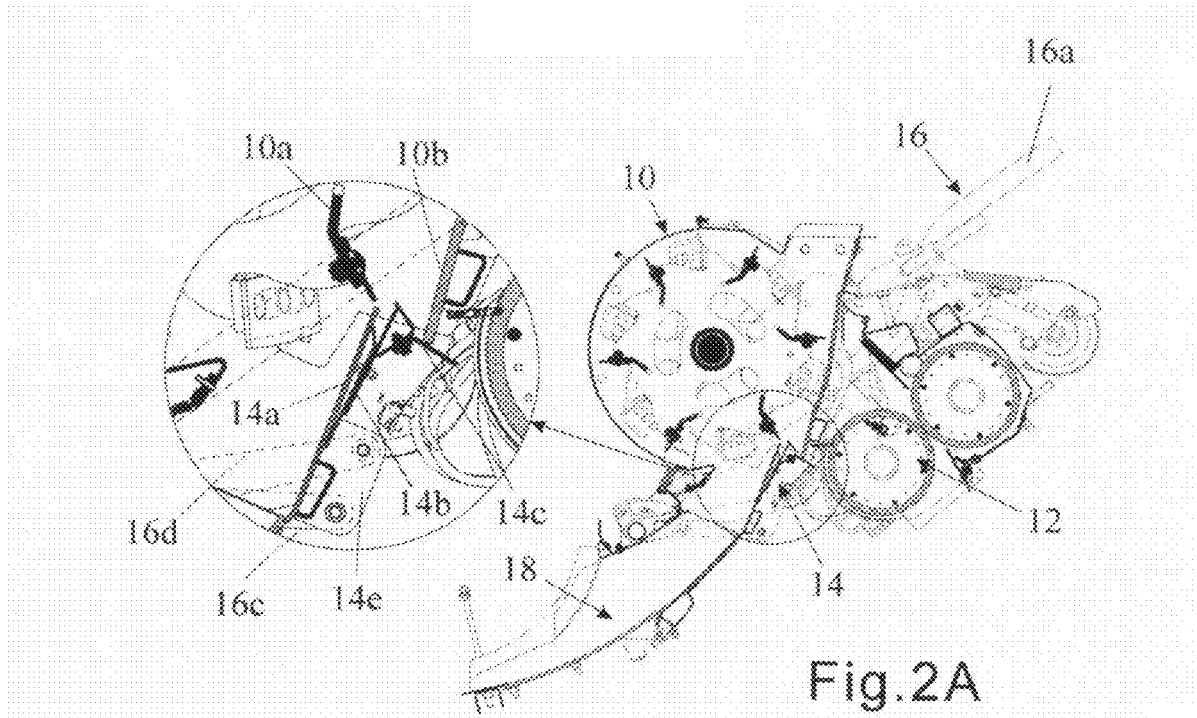
Figure 2B:
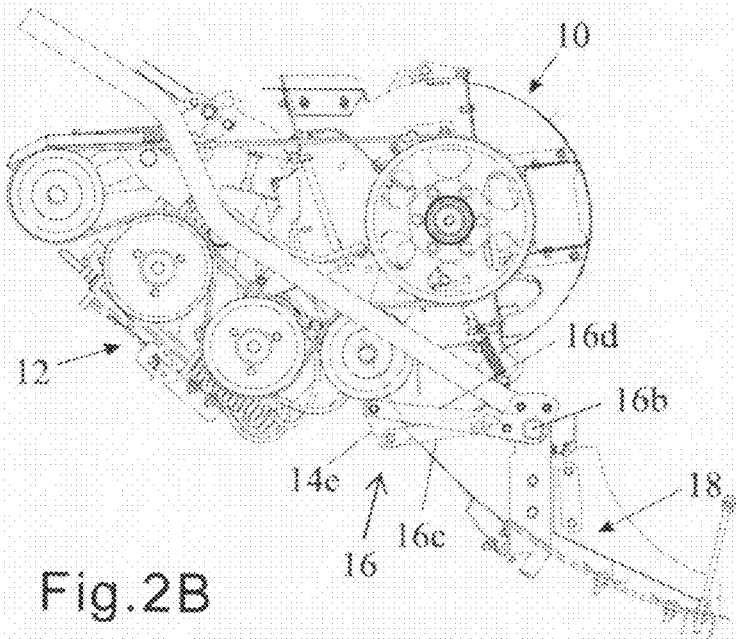

The invention will now be described further, by way of example, with reference to the accompanying drawings, in which:

FIGS. 1A and 1B are respectively a section and a view from the opposite side of a blower and a crop processor of a forage harvester, with the crop processor moved into an inoperative position and with the deflector plate in a position suitable for dense crops such as maize, FIGS. 2A and 2b are views similar to FIGS. 1A and 1B, with the crop processor once again in an inoperative position but the deflector plate moved to a position suitable for light crops such as dried grass, and FIGS. 3A and 3B are similar views with the crop processor moved into the crop flow path leading to the blower for cracking maize kernels and an assembly of which the deflector plate forms part moved to an inoperative stowage position.

The blower and crop processor assembly in the accompanying drawings is a modification of that described in EP 1 600 050. To avoid unnecessary repetition, the latter patent is imported herein by reference in its entirely. EP 1 600 050 describes a forage harvester in detail and discloses an accelerator (also termed a blower) that can be moved complete with its housing relative to the chopper and a crop processor that can be pivoted into and out of the crop flow path leading from the chopper to the blower. In the ensuing description, it will be assumed that the reader is familiar with the construction of a forage harvester, the function served by the blower and the crop processor and has an understanding of how they are disposed in the forage harvester in relation to the remaining components of the harvester, namely the header for cutting or gathering the crop, the chopper for chopping the crop into small pieces and the discharge chute and spout through which the comminuted crop is discharged.

The accompanying drawings form three pairs, each pair showing a blower 10 and a crop processor 12 positioned to suit to a particular type of crop. Within each pair of drawings, the "A" drawing is a section which shows the crop flow path and the position of a deflector plate assembly 14 while the "B" drawing shows a manually operable linkage system 16 used by the operator to move the deflector plate assembly 14, and possibly also the blower 10 and the crop processor 12, into the position that best suits the crop being harvested. FIG. 2A additionally includes an inset which shows the deflector plate assembly 14 to an enlarged scale.

The blower 10 complete with its housing can be moved between two positions. In the first position, shown in FIGS. 1A and 2A, the intake of the blower 10 lies near an intake chute 18 which guides crop that has already been comminuted by the chopper (not shown) towards the blower 10. In the second position, shown in FIG. 3A, the blower 10 is raised to leave room between itself and the chute 18 for the crop processor 12 to be pivoted into the crop flow path. According to one embodiment of the invention, the linkage system 16 pivots the blower 10 and the crop processor 12 at the same so as to allow the entire operation to be carried out by a single operator. Alternatively, a distinct hydraulic actuator may be used to reposition the blower 10 and the crop processor 12, after using the linkage system 16 only to change the position of the deflector plate assembly 14.

As so far described, the blower 10 and the crop processor 12 are known from, and described in, EP 1 600 050. The improvement provided by the invention resides in the deflector plate assembly 14, the operation of which is most clearly shown in FIGS. 1A and 2A. The deflector plate assembly 14 is only used in the first position of the blower, in which the crop flows into the blower 10 directly from the chute 18. The blower 10 functions adequately with crops that require the presence of the crop processor 12 and therefore in FIGS. 3A and 3A, the deflector plate assembly 14 serves no useful purpose and is merely moved into a safe stowage position.

As can best be seen from the magnified inset of FIG. 2A, the deflector plate assembly 14 comprises a deflector plate 14a that contacts the crop as it enters the blower 10. The deflector plate 14a is coupled to the linkage system 16 by means of a pair of brackets 14e and has a back plate 14b which serves to close the housing of the blower 10 in all positions of the deflector plate 14a. To this end, the back plate 14b carries at its end a resilient and flexible flap 14c that contacts the lower edge of the rear wall 10b of the blower housing in which the deflector plate assembly 14 is mounted.

The linkage system 16 comprises a long lever arm 16a that rotates a transverse shaft about a pivot axis 16b. As described in EP 1 600 050, the lever arm 16a may be used to raise the blower from its first above described position to its second position and to pivot the crop processor 12 into the space created by raising the blower 10. The lever arm 16a is connected to the deflector plate 14a by other links of the linkage system 16 on both sides thereof. The links of the linkage system 16 form a four-bar linkage comprising a first short arm 16c that is pivotably connected to the blower housing and to the bracket 14e of the deflector plate 14a. The linkage further comprises a second short arm 16d pivotably connected to the bracket 14e of the deflector plate 14a and affixed to the transverse shaft at axis 16b. As a result, when the linkage system 16 is moved from the position shown in FIG. 1B to that shown in FIG. 2B, the deflector plate assembly is moved from the position shown in FIG. 1A to the position shown in FIG. 2A.

It will be seen from FIGS. 1A and 2A, that on account of wear, a gap can develop between the blades 10a of the blower 10 and the housing wall 10b. For certain types of crop, such as maize, this gap does not unduly affect the speed of the crop at the discharge spout when the crop flow path is tangential to the trajectory or locus of the blades 10a. As such tangential flow is the most energy efficient and requires the least amount of power to drive the blower because the kinetic energy that the crop possesses is conserved, the deflector plate 14a is positioned for such crops in the manner shown in FIG. 1A so as not to alter the direction of flow of the crop However, with less dense crops, such as dried grass, whirling at the gap between the blades 10a of the blower 10 and the housing wall 10b causes a serious deterioration in the speed with which the crop is discharged from the spout and the distance that the crop travels.

Instead of attempting to adjust the gap between the tips of the blades 10 and the housing, the present invention proposes the simpler solution of moving the deflector plate 14a into the position shown in FIG. 2A so that the crop is deflected towards the axis of the blower rotor in order to impact the blades 10a at a point along their length lying radially inwards from their tips.

In operation, the space immediately above the top edge of the deflector plate 14a which is not swept by the blades 10a of the blower will now fill with a stationary mass of crop. This has the effect of narrowing the gap between the moving blade tips and the adjacent stationary surface. In this way the speed of the crop in the discharge chute is increased, albeit at the expense of requiring more power to drive the rotor.

When the blower 10 is raised and the crop processor 12 is inserted, the linkage system 16 is moved to its third position to pivot the deflector plate assembly 14 anticlockwise by the short arms 16c and 16d, as viewed in FIG. 3B. The linkage system 16 retracts the deflector plate assembly 14 into a safe stowage position in which it does not affect the progress of the crop into the blower 10.

The invention claimed is:

1. A forage harvester having a header for harvesting crop from a field comprising:

a chopper for comminuting the crop harvested by the header, a spout from which the chopped crop is discharged and a rotary blower (10) for propelling the chopped crop from the chopper along a discharge chute leading to the spout, wherein the blower has a housing with a front and rear wall forming an entrance, wherein a deflector plate (14*a*) is mounted to the rear wall adjacent the entrance of the blower, the deflector plate being movable between a first position in which the crop is guided to flow in a substantially tangential direction relative to the trajectory of the blades (10*a*) of the blower and a second position in which the crop is deflected radially inwards from the tangential direction to blades (10*a*) of the blower at a point along their length, wherein the deflector plate has a back plate extending therefrom to at least partially cover the entrance of the blower when the deflector plate is in the first and second positions, and all positions therebetween, further wherein the back plate has a resilient flap at a distal end thereof for contacting an edge of the rear wall of the blower housing.

2. A forage harvester according to claim 1, wherein the deflector plate (14*a*) is connected to the housing of the blower (10) by a linkage, allowing movement between the first and second positions.

3. A forage harvester according to claim 2, wherein the linkage comprises a four-bar linkage.

4. A forage harvester according to claim 2, wherein the linkage comprises a lever arm (16*a*) connected at a pivot axis (16*a*) enabling adjustment of the deflector plate (14*a*) by a single operator.

5. A forage harvester according to claim 1, wherein the harvester further comprises a crop processor (12) that may be selectively introduced into and withdrawn from the crop flow path, wherein the deflector plate (14*a*) forms part of an assembly (14) that is moved away from the entrance to the blower when the crop processor is introduced into the crop flow path.

6. A forage harvester according to claim 5, wherein the crop processor (12) and the blower (10) are movably attached onto the chassis of the harvester.

7. A forage harvester according to claim 6, wherein a linkage system (16) is provided to enable a single operator to pivot the blower (10) upwards and to swing the crop processor (12) into the gap created between the blower (10).

8. A forage harvester according to claim 7, wherein the deflector plate assembly (14) is operable by the linkage system (16) for moving the blower (10) and the crop processor (12), whereby the deflector plate assembly (14) is moved away from the entrance to the blower (10) to allow the crop output of the crop processor (12) to flow into the blower (10) without flowing past the deflector plate (12) when the blower (10) is raised.

* * * * *